Dec. 14, 1954  F. A. KROHM  2,696,805
FLUID MOTOR FOR WIPER APPARATUS
Filed June 21, 1949  7 Sheets-Sheet 1

INVENTOR.
FRED A. KROHM
BY
Charles S. Penfold
ATTORNEY

Dec. 14, 1954  F. A. KROHM  2,696,805
FLUID MOTOR FOR WIPER APPARATUS
Filed June 21, 1949  7 Sheets-Sheet 2

INVENTOR.
FRED A. KROHM
BY
Charles S. Penfold
ATTORNEY

Dec. 14, 1954     F. A. KROHM     2,696,805
FLUID MOTOR FOR WIPER APPARATUS
Filed June 21, 1949     7 Sheets-Sheet 3

INVENTOR.
FRED A. KROHM
BY
Charles S. Penfold
ATTORNEY

Dec. 14, 1954   F. A. KROHM   2,696,805
FLUID MOTOR FOR WIPER APPARATUS
Filed June 21, 1949   7 Sheets-Sheet 4

INVENTOR.
FRED A. KROHM
BY
Charles S. Penfold
ATTORNEY

INVENTOR.
FRED A. KROHM
BY
Charles S. Penfold
ATTORNEY

Dec. 14, 1954   F. A. KROHM   2,696,805
FLUID MOTOR FOR WIPER APPARATUS
Filed June 21, 1949   7 Sheets-Sheet 6

INVENTOR.
FRED A. KROHM
BY
Charles S. Penfold
ATTORNEY

Dec. 14, 1954   F. A. KROHM   2,696,805
FLUID MOTOR FOR WIPER APPARATUS
Filed June 21, 1949   7 Sheets-Sheet 7

INVENTOR.
FRED A. KROHM
BY
Charles S. Penfold
ATTORNEY 2,696,805
Patented Dec. 14, 1954

UNITED STATES PATENT OFFICE 2,696,805

FLUID MOTOR FOR WIPER APPARATUS

Fred A. Krohm, Gary, Ind., assignor to Productive Inventions, Inc., a corporation of Indiana Application June 21, 1949, Serial No. 100,445

16 Claims. (Cl. 121—97)

This invention relates generally to power units, and more particularly, has to do with a windshield wiper motor of the fluid type.

An object of this invention is to provide a windshield wiper motor of the fluid drive type, which may be used for replacement purposes more readily than motors heretofore available because of its embodiment of features which give it substantially universal adaptability to the widely varying dimensional limitations and other conditions encountered in replacing fluid drive motors supplied as original equipment for automotive vehicles.

Such original equipment motors, in part because of the materials and methods used in their production, and in part because of their mechanical features, deteriorate functionally in service and require replacement. Within a period much shorter than the average useful life of the automobile in which the motor is mounted such original equipment motors frequently become almost completely inoperative from such deterioration, which includes as one of its more important features, the wearing away of the material in the raceway of the reciprocal vane employed to propel the activating shaft of the motor. Such wearing away increases steadily and, as it increases, the efficiency or power of the motor decreases because of the growing proportions of leaks which occur between the vane and the raceway. Efforts to restore the efficiency of the motor by installing a new vane and/or a new resilient seal between the vane and the raceway are only partially successful. The installation of a new raceway is not practiced to any appreciable extent because of mechanical difficulties to be encountered if attempted within the scope of the facilities ordinarily available to a service station of the average type at which such replacements are made.

Another object of the invention is to provide a method of adapting a fluid driven replacement windshield wiper motor, without physical alterations in the internal moving parts thereof, to varying performance requirements of different makes and models of motor vehicles having, respectively, different constructions and arrangements of operatively connected windshield wiper arms and blades and of shafts for the actuation thereof, and having, respectively, different constructions and arrangements of linkages or other operative connections between said motor and said shafts, whereby a wiper blade impelled by said motor is parked adjacent whichever of the two extremes of its normal stroke may correspond to the original equipment practice peculiar to that particular make and model of motor vehicle.

One great impediment to the timely replacement of vacuum wiper motors for maximum driving safety is the great variety of motors required to meet the great variety of conditions inherent to different makes and models of automobiles. One of the problems encountered in providing universality in such replacement motors arises from the fact that on some makes and models of vehicles, the normal parking position of the blade is at one end of the stroke while on other vehicles it is at the other end of the stroke. Heretofore, no method has been known whereby, in a single motor, and without alterations to its internal mechanism, the operator of the motor could, selectively and at his option, with equal facility park the arms and blades adjacent either end of the stroke.

A further novel method residing in the subject invention involves the use of means controlling the application of fluid pressures selectively to one side or another of the primary impelling member of the motor to cause parking of said member and operatively related parts adjacent one or the other of the extremes of its stroke.

Other novel methods of importance in achieving useful results in the subject invention are apparent in the drawings and specification hereof.

Wear of the raceway becomes of serious proportions usually within two or three years of usage. When it is considered that approximately 29 million of the automobiles and trucks registered at the end of the year 1948 were manufactured before World War II, it will be understood that the need for the subject invention has been a truly serious need.

As will appear hereinafter, besides the wear of the raceway, there are other important deteriorations and losses of efficiency that develop in the original equipment type of fluid drive motors (ordinarily called vacuum motors) which contribute to the necessity for replacements of the complete motor. Such original equipment motors are replaced each year in very large numbers running well into the millions of motors.

Because of frequent model changes by vehicle manufacturers, it has been necessary for the manufacturer of an original equipment fluid drive motor to vary the shape, size and dimensions of various functional parts of such motors to adapt them to a particular model of vehicle. As a result, there have accumulated over the years in the cataloging of such fluid drive motors, a very large number of models, shapes and sizes necessary for the retail service station to carry in stock in order that any substantial percentage of models of automotive vehicles requiring such service may be serviced promptly from the motor inventory on hand. It has only been practicable, heretofore, to replace such fluid drive motors with motors identical in each instance with the motor to be replaced and identical with it as to source of manufacture.

Because of the heavy and varied assortments of original equipment replacement motors required to be carried in inventory by the retail automotive outlet, comparatively few of such outlets carry any considerable range of models of replacement motors, and most automotive retail outlets carry none. Therefore, car owners are disinclined to spend the time necessary to seek out a service station able to give them prompt replacement, and are inclined to neglect such replacement, even of motors that have lost much of their efficiency, with the result that the hazards of driving, are increased not only for the owner of the particular vehicle so equipped with incompetent wiper motors but also for others.

As indicated, a purpose of the subject invention is to greatly reduce the number of motors required to be carried in retail and wholesale replacement inventories, so as to encourage and enable a much larger number of wholesalers and retailers to provide such service. to the end that driving and walking on the streets and highways will become less hazardous.

A further purpose of the invention is to provide a construction for and method of throttling the application of fluid pressures to the motor so as to facilitate control of the performance of the motor by the operator of the vehicle. For example, the manual control devices ordinarily used for starting, regulating, stopping and parking such motors are unsatisfactory in that they permit the abrupt cutting off of the fluid pressure from normal wiping operations with the result that the parking of the blade and arm often is abrupt and violent, causing slapping of the blade and/or arm against the frame of the windshield in a manner that causes them to deteriorate at an abnormally rapid rate. As will appear hereinafter, the subject invention prevents such undesirable abruptness in the control of fluid pressure and prevents the violent overthrow of the blade and arm beyond normal parking limits. The subject invention provides a throttling method and structure which promotes "cushioning" of the parking operation.

Figure 1:
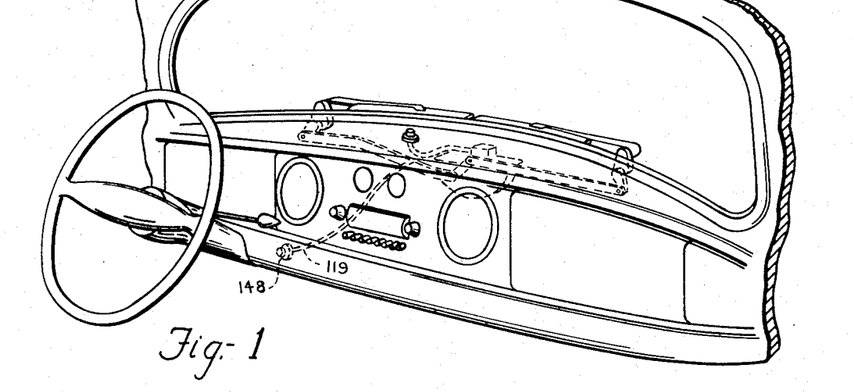
Figure 1 is a diagrammatic view of an instrument panel assembly of an automotive vehicle exemplifying a unique valve control unit which may be installed in a plurality of various convenient positions, two of such positions being illustrated.

Another object of the invention is to provide a method of and structure for manual control of the throttle (which in turn controls fluid pressure) which lends itself readily to installation for replacement purposes and can be adapted, in installation, as well to one as another of the positions of the motor with relation to the control member exposed for manual contact. There are so many different positions of the exposed manual control member (exposed usually externally of the instrument panel of the automobile at a point within convenient reach of the operator's hand) relative to such a variety of intervening obstructions in the way of wires, linkages, etc., disposed in the limited space available, as to have seriously obstructed all previous efforts to provide a substantially universal replacement for such fluid drive motors. The subject invention, as will be seen, provides within practicable ranges, unlimited adaptability to these varying conditions and permits ready installation of the motor and the exposed manual control member with a connection therebetween which operates with equal and complete success regardless of the position of the motor with relation to the position of the exposed manual control member. The exposed manual control member obviously may be installed in any desired position at the top or at the front of the instrument panel, (as indicated in Figure 1). The exposed manual control member is readily adaptable, therefore, to installation in the same position as the corresponding original equipment member, without the necessity for drilling a new hole in the supporting panel.

Another purpose of the invention is to provide throttling mechanism (Figure 26) and control mechanism (Figure 2) therefor which will permit the parking of the wiper blades adjacent either end of their arcuate stroke, without any alteration in the structure, and entirely at the option of the operator of the vehicle. This feature becomes important in a replacement motor because some of the original equipment installations park normally at one end of the stroke while others park normally at the opposite end of the stroke. These opposing characteristics naturally require the use for replacement of a different model and design of motor, when replacements other than those identical with the original equipment installation are not available. Thus the invention removes one of the further and important obstructions to universality.

Figure 2:
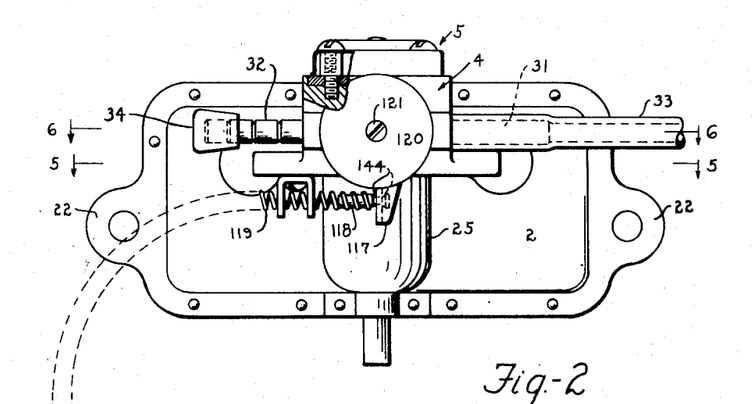
Figure 2 is a top view of a vacuum type windshield motor showing the valve control assembly operatively associated therewith.

A further object of the invention is to remove still another obstruction to universality occasioned by the fact that such original equipment motor may have the hollow nipple over which the rubber hose is fitted extending from the motor in a given direction (toward the right-hand side of the car, for example) or on another model extending from the motor and in an opposite direction. This makes inconvenient, if not impossible, the connection of such hose with any motor having such hollow nipple on a side of the motor opposite to that from which the hose approaches the motor. The subject invention provides a novel construction and arrangement of channeling of fluid conduit which permits the attachment of said hose to either side of the motor so that, regardless of the angle of approach of the hose, it may be as readily connected to the motor as if it were identical with the original equipment motor which it replaces, which construction permits the closure of the opposite nipple by a rubber cap (as shown in Figure 2).

Another object of the invention is to provide an improved valving device for automatically alternating fluid pressure (or suction) at opposite sides of the driving vane. Ordinary devices for this purpose are bulky and require a space allowance which restricts the lateral cross-sectional dimension of the raceway of the motor, and thus restricts the over-all power of the motor. Such ordinary valve devices also involve the use of die cast parts which are costly—and are inclined, particularly after considerable wear, to develop leakage between the surfaces of relatively moving contacting members. The subject invention embodies a valving device constructed and arranged to employ much less costly punch press parts and to provide a subassembly of thinner structure which permits adding to the lateral cross-sectional dimension of the motor raceway without adding to the over-all width of the complete motor assembly. It will be noted by reference to the drawings and to the following specification, that the subject valving device creates the "flip" or throw of the valve, from one extreme position to the other, by the use of opposed identical external cams which react to a common spring, whereby the rate of wear on each of these two cams is approximately one-half of the rate of wear on a single cam if used for the purpose, and the spring pressure created by the two opposing cams is balanced so as to avoid unequal urging of the motor shaft which carries the dual-faced internal cam. The external cams may be made of cloth impregnated plastic such as commonly used elsewhere in automobile cams or levers subject to wear, thus to minimize noise of operation.

Another purpose of the invention is to provide a floating valve member responsive to fluid suction and thereby held in uniform and constant contact with the opposing face, carrying terminals of conduits, so that any tendency to create or permit leakage between the valve member and the face will be minimized.

Figure 14:
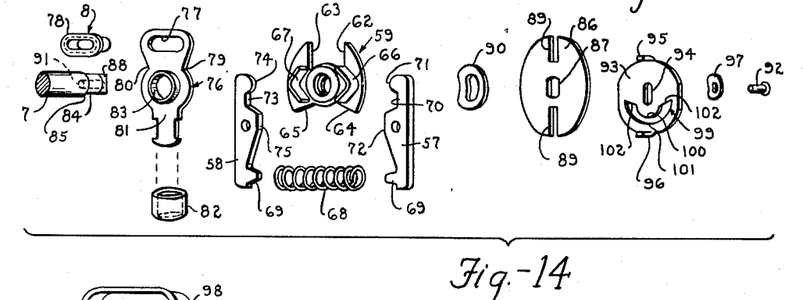
Figure 14 is an exploded view of parts of the secondary valve mechanism and manual control therefor.
Figure 15:
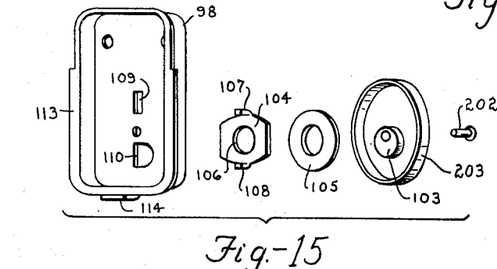
Figure 15 is an exploded view of those parts of the manual control for the secondary valve which are normally carried by the cover plate.

Another object of the invention is to provide a drive member 93, as illustrated in Figure 14, for engagement with the motor shaft, said member having lugs 95 and 96 projecting through a guide plate and constructed and arranged to contact and urge forward inner portions of the internal cam member so that the over-all degree of arcuate movement of the windshield wiper arm may be varied to suit varying requirements of different motor vehicles. By this unique method and structure a still further obstruction to universality of design and application of replacement windshield wiper motors of the vacuum type is substantially eliminated. It will be noted that the drive member, as shown in Figure 15, may be shifted and adjusted by a manual control element 203 preferably operating in conjunction with an eccentric.

A further object of the invention is to provide a throttling method and mechanism constructed and arranged so that, without alteration of such construction and arrangement, movement of the throttle from its median position in either direction will produce reversely a substantially identical performance of the driving vane of the motor.

Another object of the invention is to provide a secondary valve assembly and mounting plate therefor, which may be assembled separately of the motor, may be installed in the complete motor assembly as a preassembled unit, and thus may be replaced independently of any other replacement, when and if for any reason required to be replaced.

Another object of the invention is to provide a novel construction and arrangement of parts and assembly whereby essential characteristics of parts may be readily attained by the use of conventional punch press equipment and processes, thus facilitating volume production. As an example, it is common practice to die cast the raceway and mounting frame in one pice. Besides limiting the raceway to die cast materials, which are less resistant to wear, this one-piece die cast member must be made in various sizes and shapes to meet the varying dimensions and locations of different mounting brackets to which such motor must be attached. This means the costly construction and maintenance of elaborate die casting dies in various shapes and sizes.

Figures 4, 5, 7:
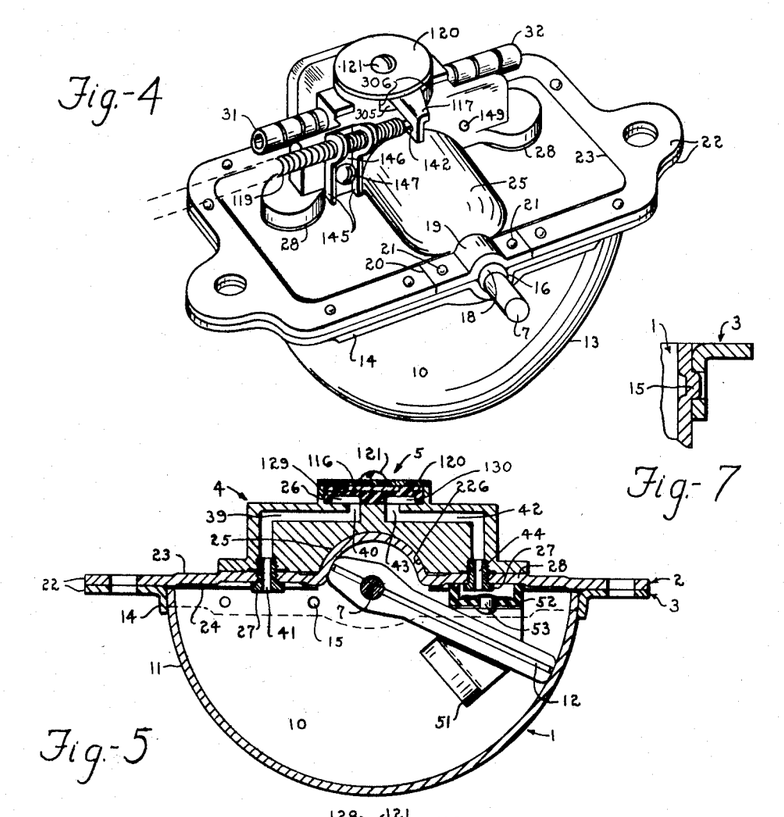
Figure 4 is a perspective view of the motor assembly.
Figure 5 is a vertical section taken substantially on line 5—5 of Figure 2 showing various fluid passages and one position of the valve vane.
Figure 7 is a transverse section taken through a part of the housing and frame showing how they are preferably united or connected.

In the subject invention, the raceway housing 1, as shown in Figure 5, is drawn out of sheet metal, preferably aluminum, the frame 3 is formed separately and may be formed of a different metal such as stainless steel, to give greater strength than die cast material or aluminum. Thus, by making this assembly in two pieces a different material may be used in each piece, to obtain in each piece characteristics most desirable. The raceway housing is nested in the frame and is preferably connected to such frame by the novel method of extruding portions of the housing in openings provided therefor in the frame, the points of connection being located out of the path travelled by the vane.

A number of important advantages are obtained through this novel two-piece construction and arrangement of raceway housing and frame. To meet the requirements of different locations of mountings it is only necessary to vary the dimensions of the frame. Thus all of the raceway housings of a given size or power category of the motor remain identical and their production may continue uninterrupted for die changes in the processes. This accomplishes substantial savings in cost because production runs of the raceway housing extend to the sum total of all of the motors to be manufactured in that power category.

The rate of wear in a frictional raceway such as is employed in the subject invention is influenced by the disposition of the grain of the metal toward the direction of travel of the vane, for example. By forming the raceway as herein described, the grain of the metal may be disposed at any desired angle and thus the durability of the raceway may be enhanced. Die cast metal is relatively porous and is without uniform grain.

Ordinary care in handling of materials for production and parts in production, provides a substantially smooth and uniform contact surface in the raceway, without applying a finishing operation. When the raceway housing is formed of aluminum, its interior frictional surfaces may be chromium-plated by well-known methods which give the raceway a flint-like hardness difficult even to scratch with a file. Thus the method and construction and arrangement herein described result in a motor raceway housing and frame assembly more desirable both from the standpoint of (1) facilitating volume production, and (2) increasing resistance to wear of critical parts.

It may be added that to attempt by punch press methods to form the raceway housing and frame integrally out of one blank would introduce serious problems of which no practicable solution has been found within permissible cost ranges. It will be noted that the top marginal edges of the raceway housing must be substantially uniform and true to permit a tight seal against the cover to prevent leakage under vacuum. The raceway housing which forms a part of the subject invention is readily held substantially true and uniform at edges to which such seal is required. Any attempt to form these two pieces integrally from a single blank would result in a comparatively irregular surface at the area of seal. Thus the degree of perfection of seal required for practical results could not be attained, even by subjecting the part to so large a number of operations as would make the cost of the part prohibitive.

It will be noted that the narrow top marginal edges of the raceway housing must conform accurately to that portion of the cover recessed for the purpose of receiving it in sealed relationship. In perfecting this seal, a thin gasket usually is employed.

Another object of the invention is to facilitate replacements where necessary, and to minimize their cost, by providing detachable subassemblies which are readily replaceable, such as the mounting block. It will be noted that on this block (which, on account of its various functions and multiple passages may be a die casting) carries the throttle valve and the valving assembly. By removing this one block with the throttle and the valving mechanism attached to it, substantially the entire functional structure of the invention may be replaced—or any of the three elements (throttle, valving mechanism or mounting block) may be replaced.

Figure 6:
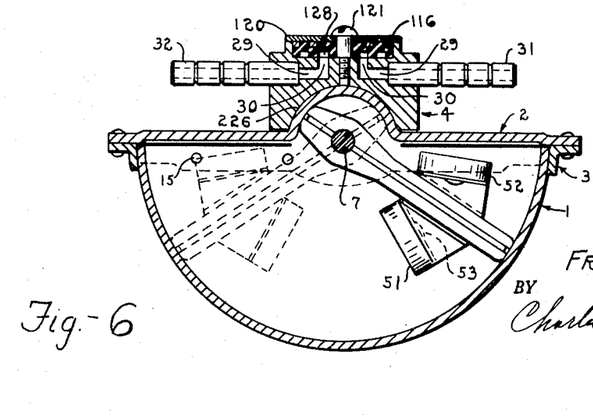
Figure 6 is a vertical section taken substantially on line 6—6 of Figure 2 showing other fluid passages and two different positions of the vane.

Another object of the invention is to provide an improved construction and arrangement of parking seals 51 and 52, as illustrated in Figures 5 and 6, by which the vacuum may be sealed against the inner surface of the cover 2 when the vane 12 is in parking position. It will be noted that two directly opposite resilient cup-like parking seals are mounted, one on either side of the vane, so that the vane may be parked at either end of its stroke and the wiper arms and blades may be parked correspondingly at either end of their stroke.

It is obvious that when the motor is made for original equipment of an automotive vehicle where all functional and dimensional requirements are predetermined, those structural and functional features of the invention introduced solely to provide universality may be omitted and their cost avoided. For example, only one vacuum seal would be required because the vane would park only at one predetermined end of its stroke. Only one hollow nipple would be required, since the vacuum hose would approach always from a predetermined side.

The outer end of the motor shaft 7 may be so constructed and arranged as to be readily adaptable to the type of linkage preferred for connecting it operatively to the wiper arm and blade.

In addition to the foregoing, one important object of the invention is to provide an improved primary valve body having a unique arrangement of passageways and ports by which the size and weight of the body may be materially reduced.

A particular object of the invention is to provide a manual control on the motor, independent of the flexible control unit on the instrument panel, so that the rotational range of the motor shaft and the vane or piston may be varied and predetermined to meet different installation requirements.

Another object of the invention is to provide a primary valve seat and a valve embodying improved principles of design and construction whereby it may be caused to automatically adjust and seal itself with respect to the seat, including means extending through the valve into the body for detachably holding the valve in place.

A significant object of the invention is to provide a primary valve and a control assembly with unique means for operatively connecting the valve with the control assembly.

Another object of the invention is to provide a setup whereby the unique means employed for operatively connecting the valve and control assembly together may be manipulated to either of two positions for predetermining the rotational range of the primary valve so that the wiper arm and blade assembly may be parked only at either side of a windshield.

An additional object of the invention is to provide a filter for filtering the air admitted into the chamber or raceway of the motor, including a novel arrangement for securing the filter in operative position.

A significant object of the invention is to provide a novel cover for the secondary valve operating mechanism, the cover serving a plurality of uses.

A further object of the invention is to provide improved means concealed from view for securing the primary valve body to the mounting plate.

A still further object of the invention is to provide means for rendering the secondary valve operating mechanism substantially noiseless.

Also, an object of the invention is to provide a system of valving whereby the wiper arm attached to the motor shaft may be eased into a parking position and thereby avoid the objectionable slap of a wiper blade against the frame of the windshield.

Other objects and advantages of the invention will become apparent after the description hereinafter set forth is considered in conjunction with the drawings annexed hereto.

Referring to the drawings, wherein like parts are designated by the same numerals.

Figure 18 is a front view of a retainer employed for the filter above referred to;

This application is a continuation-in-part of applicant's prior copending applications Serial No. 83,896 filed on March 28, 1949 and Serial No. 92,634 filed on May 11, 1949.

The motor structure exemplified in Figures 2, 4, 5, and 19 of the drawings includes, among other things, a housing 1, a cover 2, a mounting frame 3 permanently secured to the housing, a valve body 4 detachably secured to the cover, a primary or throttle valve 5 carried by the valve body, mechanism or valving device 6 actuated by a driving shaft 7 for controlling a secondary valve 8, and a control unit 9 operatively connected to the primary valve.

The housing of the assembly may be designed and constructed as desired but, as illustrated in Figure 5, it is comprised of corresponding arcuate spaced apart parallel side walls 10 joined by a substantially semi-circular wall 11 to provide a chamber or raceway for a vane 12 clamped for rotation with the shaft 7. The junctions between the side and circular walls are curved as indicated at 13 in Figure 4. The mounting frame and cover are each generally rectangular in shape, the frame 3 having an opening defined by an embracing flange 14 as shown in Figures 4 and 5. The arrangement is such that when the housing and frame are permanently secured together, the curved end portions of the flange will at least forcibly engage the housing and the upper marginal edges of the housing will lie in substantially the same plane as the upper planar surfaces of the mounting frame. More specifically in this respect, the unique method of assembly consists in forcing or pressing the convex side of the housing into the frame to temporarily hold the parts in a preassembled relationship, whereupon they are permanently united by extruding or forcibly distorting portions of the housing outwardly into openings provided therefor in the flange 14 of the frame as depicted at 15 in Figure 7. These extrusions are located sufficiently close to the marginal edges of the housing that they will not interfere with the actuation of the vane. This simple and permanent locking arrangement has proven economical to manufacture and assemble and satisfactory in use.

Figure 16:
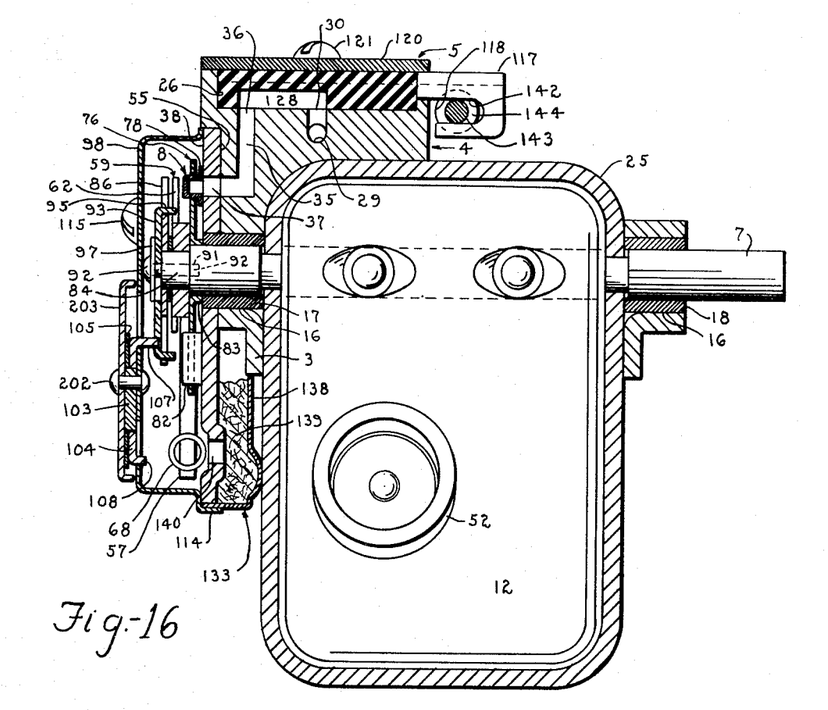
Figures 16 and 17 are vertical sections taken through appropriate parts of the motor assembly to illustrate details of construction.
Figure 17:
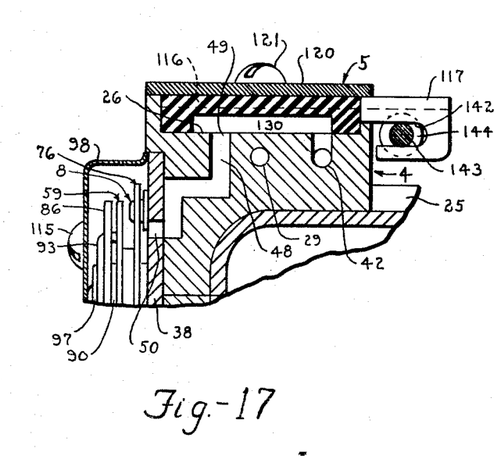

The sides of the frame, as shown in Figure 16, are provided with concave seats 16 with tubular bearings 17 and 18 disposed therein for supporting the drive shaft 7. The bearing 17 is held in place by the valve body 4 and bearing 18 by a clamp 19, as shown in Figure 4, the latter being arranged within a notch 20 provided in the cover and directly connected to the frame by rivets 21. Clearance notches as illustrated in Figure 16 are provided in the side walls 10 of the housing for the shaft 7. The cover and mounting frame, as shown in Figure 2, are preferably provided with ears 22 having aligned corresponding apertures through which bolts or other means may be extended to detachably mount the motor assembly on an appropriate part of the motor vehicle.

The frame and cover are preferably constructed of sheet metal and in order to insure a leak-proof raceway or chamber for the vane 12, the cover is preferably provided with a large rectangular recess 23, as shown in Figure 4, so that a gasket 24 with appropriate cut-outs can be clamped tightly between the upper marginal edges of the housing and the cover, as illustrated in Figures 5 and 6. The marginal edges of the gasket engage the marginal walls of the recess 23 to retain the gasket in place. It will be noted that the cover is provided with a centrally disposed raised substantially semi-cylindrical portion 25 providing a smaller raceway or chamber for the upper part of the vane. In the present construction the housing, frame and cover are constructed of sheet aluminum, and consequently, from a practical standpoint, it is desirable to provide good hard travel surfaces resistant to wear for the vane. Although not essential, these hard surfaces in practice have been obtained by chromium plating.

The valve body 4 may be constructed as desired, but is preferably made in the form of a metal block provided with a substantially semi-cylindrical recess 226 of a size to snugly receive the cylindrical portion 25 formed on the cover, as exemplified in Figures 5 and 6. The ear ends of the valve body are preferably secured by concealed screws 27 to circular bosses 28 formed on the cover. With this arrangement, the block valve body is firmly anchored to the cover.

It is essential that the cover be maintained in a true or rigid condition so that the gasket 24 will intimately engage and properly seat against the upper marginal edges of the housing and the rectangular recess 23. Rigidity and stability is imparted to the cover at least in part by the cylindrical portion 25, rectangular recess 23 and the circular bosses 28.

The upper part of the valve block is provided with a circular recess 26, as shown in Figure 5, which rotatably receives the throttle or primary valve 5 above referred to. As will be pointed out hereinafter, the valve block is provided with a plurality of passages which communicates with the recess 26 and the chamber or raceway and the secondary valve 8. The manual control unit 9, as shown in Figure 2, serves to actuate the throttle valve to control the speed or operation of the motor. Parking of the wipers is also accomplished by proper manipulation of the control unit as will be pointed out hereinafter.

The unique arrangement of the various passages in the valve body or block will now be considered. The block is provided with a pair of aligned longitudinal passages 29, as shown in Figure 6, which communicate with the recess 26 by vertical passages 30 disposed on opposite sides of the center of the recess. The opposite ends of the longitudinal passages are preferably enlarged to receive nipples 31 and 32 in order that a flexible conduit may be connected to either of the nipples in the manner above described. More specifically in this respect, if the installation requires that a conduit 33 extending from the source of suction be connected to nipple 31, the other nipple 32 may be closed by a detachable rubber cap 34 as shown in Figure 2, and vice versa.

Figures 8, 9, 10, 11:
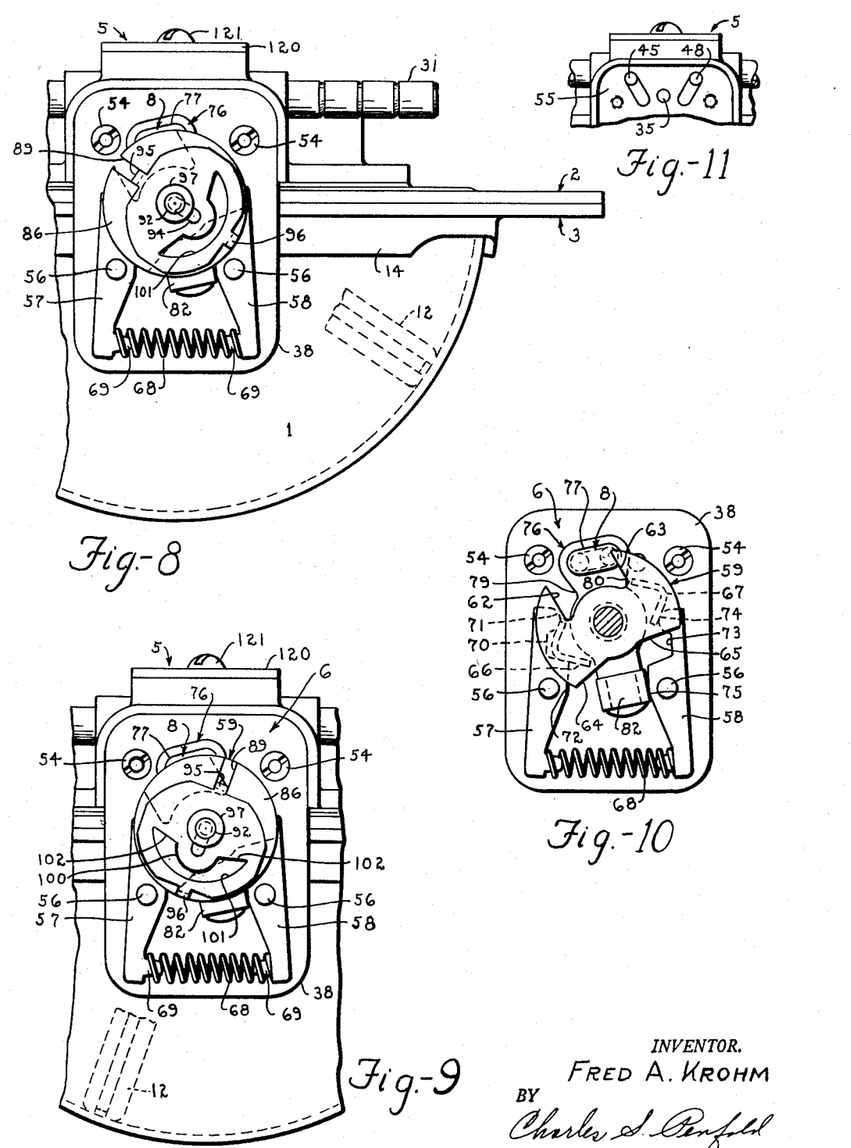
Figures 8, 9 and 10 are rear views of the motor assembly with certain parts removed to exemplify various operating positions of an improved valve operating mechanism including parts of a unique manual control for such mechanism.
Figure 11 is a front view of a part of the primary valve housing disclosing the relationship of certain passageways or ports provided therein.
Figure 26:
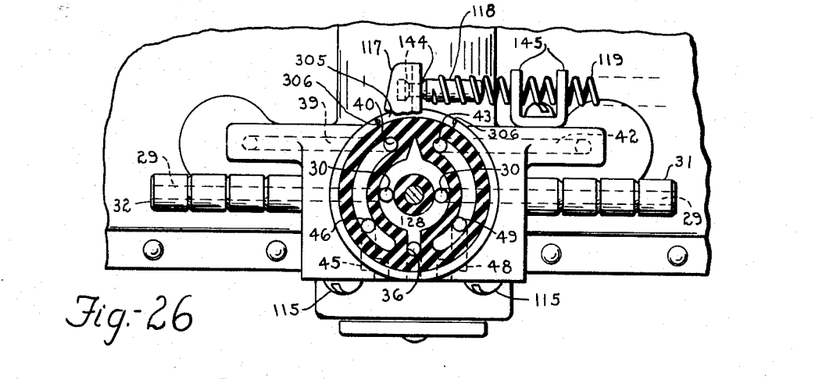
Figure 26 is a top view of a part of the motor assembly illustrating a full operating position of the primary valve.
Figures 27, 28, 29, 30:
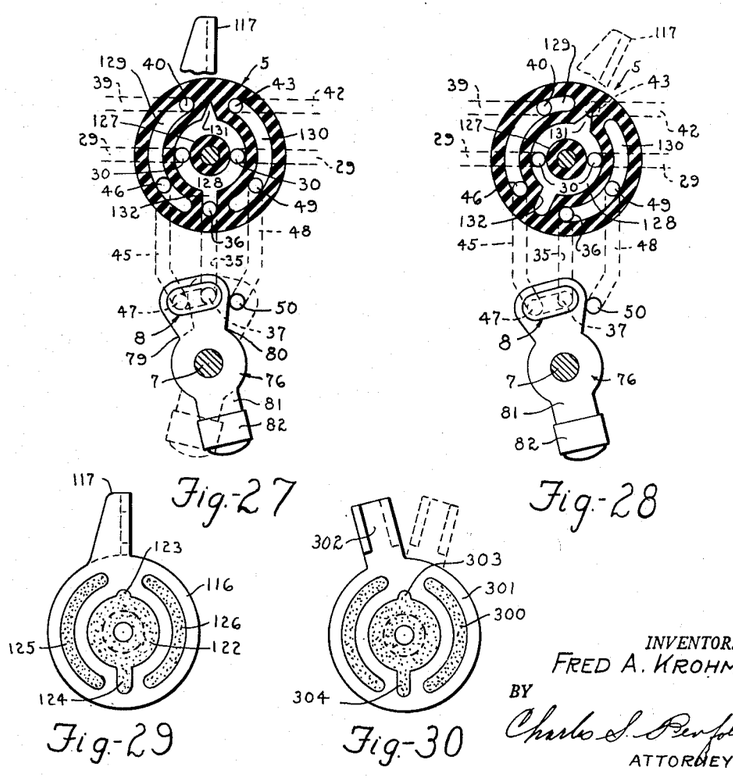
Figure 27 is a diagrammatic view illustrating two operating positions of the valve setup.
Figure 28 shows the manner in which parking of a wiper is obtained.
Figures 29 and 30 disclose modified ways of assembling the primary valve with its operating lever in order that parking of the wiper arm and blade assembly may be accomplished to meet certain requirements with respect to installing the motor.

As illustrated in Figures 16 and 27, the block is provided with an L-shaped vertical passage 35, the upper end of which communicates with the circular recess 26 at a port 36 equally spaced from the vertical passages 30, and its lower end connects with a center hole 37 provided in a mounting plate 38 for the mechanism 6, as shown in Figure 9. The block as shown in Figure 5, is also provided with a generally Z-shaped passage 39, one end of which communicates with the circular recess 26 at port 40 and its other end communicates with the chamber or raceway through the port 41 provided in the tubular screw 27. A passageway 42, similar to and aligned with passageway 39, communicates with the circular recess 26 at port 43 and a port 44 provided in the other tubular screw 27. As viewed in Figure 26, it will be noted that the aligned passages 29 are arranged substantially parallel to the passages 39 and 42.

The valve block is further provided with a passageway 45, as shown in Figure 26, one end of which communicates with the circular recess 26 at a port 46, and its other end with an aperture 47 provided in the mounting plate 38 and spaced apart from the hole 37, as shown in Figure 27. A passageway 48, similar to passageway 45, communicates with the throttle valve recess at a port 49 and an aperture 50 provided in the plate 38 and spaced apart from the hole 37, the hole 37 and apertures 47 and 50 being operatively related to the secondary valve 8, as shown in Figures 8, 9 and 10.

Cup-like resilient seals 51 and 52 are secured to the opposite sides of the vane 12 by suitable brackets and fastening means 53, as shown in Figure 5. Attention is directed to the fact that the diameter of each seal is somewhat less than the diameter of the bosses 28 formed on the cover 2 so that, for example, the end of seal 51 will engage the under flat surface of boss 28 to close the port 41 provided in the cover at one side of the vane, and the corresponding edge of seal 52 will similarly engage a boss to close the port 44.

The mechanism 6, as illustrated in Figures 9 and 10, carried by the mounting plate 38 embodies improved principles of design and construction and will now be described.

Figures 12, 13:
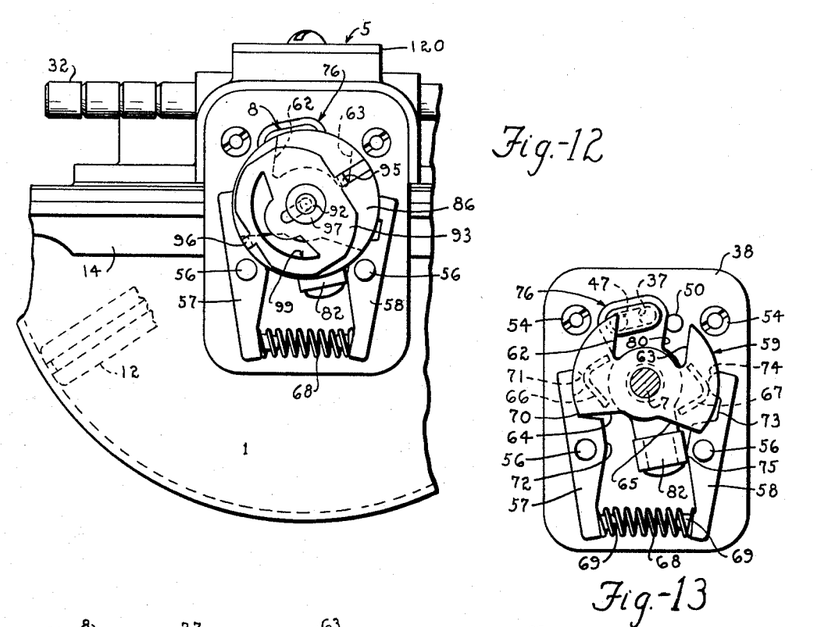
Figure 12 is a view, similar to Figures 8 and 9, illustrating different operating positions of certain components.
Figure 13 is a view similar to Figure 10 showing different positions of various components of the valve operating mechanism.

The mounting plate 38 and mechanism 6 are preferably associated together to constitute a subassembly which may be readily detachably connected to the motor block by screws 54, as shown in Figure 13. As illustrated in Figures 11 and 16, the valve block is preferably recessed at 55. The cover and frame are also provided with recesses to receive the upper extremity of the mounting plate 38. With this arrangement, the subassembly is firmly interlocked with the valve block. This is important from the standpoint of maintaining the hole 37 and apertures 47 and 50 in the mounting plate in registry with the passageways 35, 45 and 48, respectively.

The mounting plate is provided with an aperture which receives the shaft bearing 17, as shown in Figure 16. As illustrated in Figures 8, 9, 10, 12 and 13, pivots 56 extend transversely through the mounting plate 38 and pivotally support a pair of corresponding rocker arms 57 and 58 for maintaining a cam member or kicker 59, rotatable on the shaft 7, in predetermined rotative positions in order that the fluid intended to circulate through certain of the passages will not be interrupted except at predetermined intervals. This cam member may be constructed as desired, but, as depicted in Figure 14, it is preferably made by stamping same out of sheet metal stock to provide a notch forming a pair of spaced apart substantially parallel abutments 62 and 63 adjacent one side of the member, and an interruption adjacent its opposite side to form a pair of spaced marginal edges 64 and 65. The inner face of member 59 is provided with rearwardly extending walls to form generally V-shaped cams 66 and 67. If found desirable, these cams may be constructed in the form of pins. The upper ends of the rocker arms 57 and 58 are continuously yieldably urged into engagement with the cams 66 and 67 by a helical expansible spring 68 carried by lugs 69 on the lower ends of the arms. The upper end of the rocker arm 57 is provided with a notch 70, a rounded abutment 71, and an abutment 72 adjacent the pivot 56. The rocker arm 58 is similarly provided with a notch 73 and abutments 74 and 75.

An elongated oscillating member 76, carrying the secondary valve 8, is also rotatably mounted on the motor drive shaft 7 (see Figures 14 and 16). This oscillating member is provided with an upper head portion having a slot 77 therein which loosely receives the valve 8. The body of the valve is of hollow construction and includes a flange 78 which is disposed between the oscillating member and the front face of the mounting plate in order to prevent escape of the valve. This valve is operable to alternately place the hole 37 in the mounting plate in communication with first one and then the other of the apertures 47 and 50 as illustrated in Figure 27.

The oscillating member is provided with notches 79 and 80 adjacent the head portion and its other extremity or tail portion 81 is provided with a rubber bumper 82 in the form of a sleeve surrounding the tail. The tail is preferably notched as shown so that portions of the sleeeve or tube will recede into the notches to automatically lock the tube in place. The upper marginal ends of the cams 66 and 67 are adapted to periodically engage the notches 79 and 80 to flip the oscillating member. If found desirable, the construction may be modified so that the lower marginal ends of the cams will periodically engage the tail 81 at the same time that the upper ends of the cams engage the notches 79 and 80, or the lower ends may act to flip the oscillating member in lieu of the upper ends. The oscillating member is also provided with a central tubular portion 83 which preferably engages the end of shaft bearing 17 to maintain the member in predetermined spaced operative relationship to the parts to be engaged thereby. It will be noted that the tubular portion 83 rides on the larger cylindrical portion of the shaft 7 whereas the cam member 59 rides on a reduced cylindrical portion 84 and engages the shoulder 85 between such cylindrical portions for predetermining the position of the cam member.

The adjustable means on the motor whereby any required rotational range or movement of the motor shaft and vane or piston may be obtained is unique in character and will now be described. A round guide plate 86, as shown in Figure 14, rotates with the shaft 7 by reason of an oblong center opening 87 in the plate which receives the reduced oblong end 88 of the shaft. The periphery of this plate is preferably interrupted by a pair of diametrically opposed corresponding slots 89 which are arranged in alignment with the oblong opening 87. A resilient metal washer 90 may be mounted on the shaft between the cam member 59 and the guide plate 86 in order to assist in reducing friction therebetween. An axial hole 91 is provided in the end of the shaft 7 and receives the shank of a headed pin 92.

A driver 93 preferably made in the form of a plate is provided with a central straight slot 94 which receives the pin 92. This driver is also provided with a pair of rearwardly extending diametrically opposed fingers 95 and 96 adjacent its periphery which are of a sufficient length to project through the slots 89 in the guide plate 86, and with finger 95 between the abutments 62 and 63 on the cam member 59 and finger 96 between the spaced marginal edges 64 and 65 adjacent the lower edge or side of such cam member. A small metal spring washer 97 is preferably mounted on the shank of the pin 92 and bears against the outer surface of driver 93 and the under side of the head of the pin 92 in order to assist in pressing the driver rearwardly and maintain the various parts of the actuating mechanism in proper assembly. The shank of the pin 92 is detachably held in the axial hole 91 of the shaft by a cover or shield 98, as shown in Figure 15, so that removal of the cover will permit disassembly of the actuating mechanism carried by the shaft 7. The driver is further provided with a curved slot 99 defined by an upper marginal arcuate edge 100 of a predetermined radius and a lower arcuate marginal edge 101 of a different radius and the ends of the curved slot terminate in abutments 102.

Figure 19:
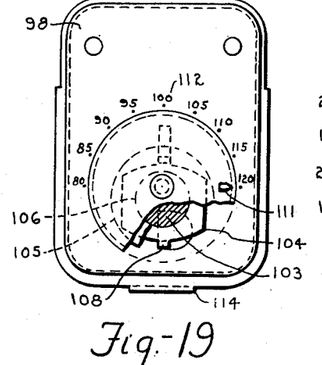
Figure 19 is a front view in elevation of a subassembly of the manual control embodying the parts illustrated in Figure 15 and a dialing setup.
Figure 20:
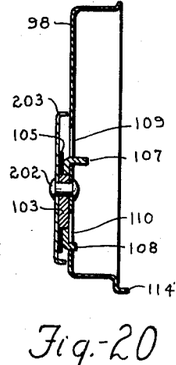
Figure 20 is a vertical section taken through Figure 19, exemplifying details of construction.

Movement of the driver 93 to obtain a desired range of rotational movement of the motor shaft may be accomplished in various ways but as herein illustrated, its movement is preferably controlled by manually rotating a knob 203 carried by the cover 98, as shown in Figure 15. This knob is attached to the cover by a rivet 202 which extends through the knob and cover and also through a driver or eccentric 103 anchored for rotation with the knob. As shown in Figures 15, 19 and 20 the eccentric, including an actuating element 104 and a resilient washer 105, are interposed between the front wall of the cover and the front wall of the knob. It will be noted that the washer bears against the knob and the actuating element for the purpose of obtaining sufficient friction to maintain the parts in position after they have been adjusted. The actuating element is provided with a circular aperture 106 which rotatably receives the eccentric and is further provided with a pair of diametrically opposed rearwardly extending lugs 107 and 108. The longer lug 107 projects through a vertical slot 109 in the cover and into the curved slot 99 of the driver 93 and the shorter lug 108 extends into a clearance 110, the latter being diametrically opposed to the slot 109. With this unique arrangement, the driver 93 is adapted for movement only in a plane parallel to the guide plate and transverse to the longitudinal axis of the motor shaft and the actuating element is limited to a generally vertical and swinging movement parallel to the cover and substantially transverse to the longitudinal axis of the rivet 202. The knob may be provided with an arrow or mark 111 and the cover with a dial 112 indicating various degrees of rotation for the motor shaft. The actions resulting from adjusting the control knob 203 to various positions will be described more in detail subsequently.

The shield 98 covers the valve operating mechanism 6 and includes a border flange 113 which is adapted to bear against mounting plate 38 and a lower inturned finger 114 which extends under and rearwardly of the plate. Screws 115 received in the outer internal threaded ends of screws 54 serve to detachably secure the shield 98 in place. The front wall of the shield as stated above, is adapted to be engaged by the rivet pin 92 to retain parts of the secondary valve operating mechanism in proper assembly.

The primary valve 5 may be constructed in various ways but as herein illustrated, is preferably made round and of neoprene or some other desirable resilient material that will tend to automatically adjust and seal itself with respect to its seat. A metal lever having a round flat portion 116, as shown in Figures 4, 5 and 6, is interlocked with the valve and includes an offset tab 117, the latter being provided with an opening which is adapted to receive a connector 118 attached to the inner end of helical flexible control member 119 constituting a component of the manual control unit 9. A plate 120 overlies the valve 5 and engages the valve block and holds the valve and lever assembled in the valve recess 26. A pivot screw 121 extends through plate 120, lever and valve and into the valve block. As exemplified in Figure 29 of the drawing, the interlock between the lever and valve is preferably accomplished by providing the upper side of the valve with a plurality of raised or elevated portions, including a round central portion 122 having diametrically disposed radial portions 123 and 124 and corresponding arcuate portions 125 and 126, all of such portions being received in clearance openings in the lever having shapes corresponding to these portions.

The throttle valve 5, as shown in Figure 27, is provided with a tubular center core portion 127 and its underside with an annular recess 128 surrounding the core. When the motor is in operating condition as exemplified in Figure 27, the passages 29 leading to the vacuum supply means and passage 35 leading to the secondary valve 8 will be placed in communication with the annular recess 128 through ports 30 and 36, respectively. The valve is further provided with a pair of separate corresponding arcuate recesses 129 and 130 disposed substantially concentric to the annular recess 128. Attention is directed to the fact that the annular recess is provided with diametrically disposed connecting recesses 131 and 132, which will be described more in detail subsequently. The annular recess is at all times in communication with the passages 29 leading to the vacuum means. Attention is further directed to the fact that these recesses substantially correspond in shape and size with the raised or elevated portions 122 through 126 provided on the upper surface of the resilient primary valve 5.

Figure 18:
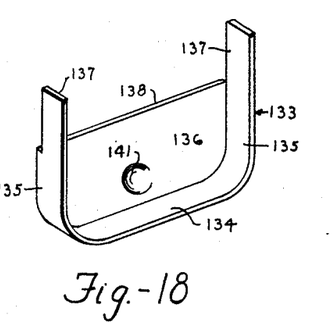

As clearly illustrated in Figures 13 and 16, means are provided for filtering air which is introduced through the apertures 47 and 50 provided in the mounting plate 38 leading to the interior of the housing. The cover 98 is adapted to bear relatively tight against the outer face of the mounting plate to provide a substantially fluid-tight construction so that any air that is admitted into the housing or raceway through the apertures in the mounting plate will have to pass through the filter. The filtering means may be designed and constructed as desired but as illustrated in Figure 18, includes a receptacle 133 having a bottom wall 134, end walls 135, and a back wall 136. The end walls 135 are provided with upwardly extending continuations 137. The end walls 135 and the continuations 137 are adapted to embrace the side edges of the mounting plate and the upper transverse marginal edge 138 of the back wall may engage the frame 3, as shown in Figure 16. The bottom wall 134 is adapted for disposition between the lower marginal end of the mounting plate 38 and the inturned finger 114 of the cover 98 in order to retain the receptacle 133 in place. A piece of felt 139 or the equivalent is normally firmly held in the receptacle 133 and when the receptacle is in place as just described, the felt will be maintained in position over one or more holes 140 provided in the lower extremity of the mounting plate 38. It will be noted that the lower extremity of the plate is slightly offset inwardly, the purpose of which is to provide clearance for proper movement of the actuating spring 68. The hole 140 is provided in this offset and the latter also assists in slightly compressing the felt so that any air admitted to the hole 140 will be required to pass through the felt to filter the air and prevent the admission of any foreign matter into the raceway. Attention is directed to the fact that there is a relatively loose fit between the receptacle 133 and the mounting plate, the purpose of which is to permit the air to seep or flow into the receptacle. If found desirable, the back wall 136 of the receptacle may be provided with a projection 141 whereby to assist in maintaining the receptacle in proper assembly with the mounting plate.

Referring again to the flexible manual control unit 9, as depicted in Figures 2, 4, 17, and 26, the opening in the tab 117 includes a slot 142 so that the reduced portion 143 of the connector 118 may be received in the slot and the tab 117 will be held between abutments 144 provided on the connector. With this arrangement, a detachable easily workable coupling or connection is established between the flexible control member 119 and the tab 117 of the primary valve 5. The connector 118 is preferably of a diameter not in excess of the diameter of the flexible member 119 in order that the connector will pass through threaded apertures formed in the legs 145 of a fitting 146 secured to the valve block 4 by a screw 147. The flexible member threadedly engages the threaded apertures and is of such a character that a knob of 148 adjacent its outer end may be disposed in any location on the instrument panel desired for convenient operation, for example, at the top or front as illustrated in Figure 1 of the drawing. Attention is directed to the fact that the valve block is provided with a threaded opening 149 so that the fitting 146 may be connected to another part of the block depending on the hook-up of the control means 9.

Figure 3:
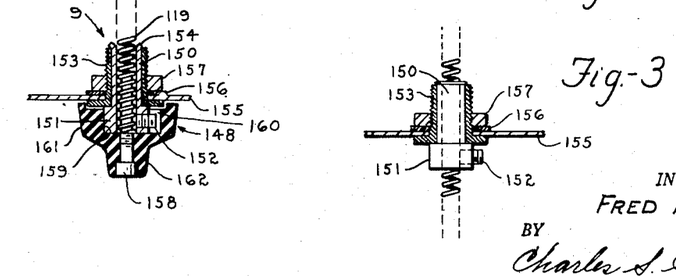
Figure 3 is a view showing a component of the control unit.

The outer end of the flexible member as illustrated in Figures 2 and 3, preferably carries a tubular bushing 150 having an enlarged end 151 provided with a set screw 152 for detachably securing the bushing to the flexible member. A flanged exteriorly threaded bearing 153 is secured to the reduced portion of the bushing by flaring outwardly the inner end of the bushing at 154 in a manner to permit relative rotation between the bushing and bearing. The bushing and bearing are adapted to extend through an aperture provided therefor in an instrument panel 155 with the flange of the bearing engaging the front surface of the panel. A washer 156 engages the rear side, and a nut 157 engages the bushing to lock the parts to the panel. The knob 148 is secured to the enlarged portion 151 of the bushing by means of a screw 158 which extends axially through the knob and is threadedly received in the threads formed by the flexible member 119. An annular recess 159 in the knob is enlarged at 160 in order that the set screw 152 may extend therein to further make certain that the knob will rotate with the bushing. The knob is provided with a pair of knurled annular portions 161 and 162, one of which is larger than the other.

The manual control unit 9 provides means whereby the throttle or primary valve 5 may be accurately controlled to govern at least one phase of operation of the motor. The operation of the motor and parking features thereof are comparatively simple and will now be described.

As stated above, the annular recess 128, as shown in Figure 26, formed in the under side of the throttle valve 5 is at all times in communication with the vacuum means. When the throttle valve 5, secondary valve 8 and the various components of the mechanism 6, including the vane 12 are in the positions illustrated in Figures 5 and 28, the motor shaft will be held against movement to operate a wiper arm and blade, this being due to the fact that the recess 128 is not connected with the port 36 in the motor block leading to the hole 37 in the mounting plate through passage 35, and when the secondary valve is carried over to the position illustrated, the passages 39, 45, 35 and 48 will be vented to the atmosphere through the aperture 50 in the mounting plate so that vacuum is created through port 44. More specifically, when the throttle valve 5 is in such position, the recess 128 will be placed in communication with the port 43 which connects with port 44 in screw 27 through passage 42, all of which will cause the cup seal 52 to be drawn intimately against the boss 28 and thereby maintain the motor shaft 7, and the wiper arm and blade operatively connected thereto, in a parking position until the valve 5 is moved to place recess 128 in communication with port 36, as illustrated in Figures 26 and 27, in which event the secondary valve 8 will be caused to oscillate and connect ports and passages to actuate the vane. The cup seal 52 also serves to prevent seepage of air from the raceway or chamber into the port 44 and further acts to cushion the parking stroke of the vane.

Moreover, it will be noted that when the vane is in the parked position as above described and illustrated in Figure 5, various components of the actuating mechanism will assume predetermined positions. More specifically in this respect and as viewed in Figure 10, cam 66 of member 59 will be caught in the notch 70 of rocker arm 57 and cam 67 will be caught between notch 80 on the head portion of oscillating member 76 and the abutment 74 on the upper end of rocker arm 58, and that the rubber bumper 82 on the tail portion of the oscillating member will engage the abutment 75 on this rocker arm. Whenever the throttle valve is moved by the manual control unit 9 so that the recess 128 takes a position opposite to that illustrated in Figure 28, the recess 132 of recess 128 will be located between ports 36 and 49 in the valve block, and the seal 51 on vane 12 will be drawn against the other boss 28 to close the port 41 provided in the other screw 27, so that depending on the hook-up or installation of the motor the vane will be parked in a position directly opposite to that illustrated in Figure 5. When so parked the aperture 47 in the mounting plate will be exposed to the atmosphere and passage 39 connected to port 41 in the screw and port 40 in the block will be placed in communication with the vacuum through recess 128 which is at all times connected to the vacuum. Also the cam member 59 and oscillating member 76 will assume reversed positions with the cam 67 in notch 73 of rocker arm 58, cam 66 caught between abutment 71 at the upper end of rocker arm 57 and notch 79 of member 76, and the bumper 82 on the oscillating member bearing against abutment 72 on the rocker member 57. This rubber bumper serves to eliminate noise.

To operate the motor, the throttle valve 5 is rotated to the position illustrated in Figures 2, 26 and 27 by the flexible member 119 to connect the annular recess 128, which is at all times in communication with the vacuum, with port 36 through recess 132, port 36 leading to hole 37 in the mounting plate 38 through passage 35, thereby connecting the secondary valve 8 with hole 37 and aperture 47 in the mounting plate, aperture 47 with port 46 through passageway 45, port 46 to port 40 through arcuate recess 129 in the valve, and port 40 to port 41 in the screw 27 through passageway 39, to establish a through line of communication from passage 29 to secondary valve 8 and port 41 to cause the vane 12, previously in the parked full line position in Figure 5, to be pulled to the left, as exemplified by the dotted lines in Figure 6. The moment the secondary valve 8 is flipped from aperture 47 by the actuating mechanism 6 to cover aperture 50 in the mounting plate, communication will be established between port 44 in screw 27 and port 43 through passageway 42, port 43 to port 49 through arcuate recess 130 in valve 5, port 49 to aperture 50 through passageway 48, aperture 50 to hole 37 through valve 8, hole 37 to port 36 through passageway 35, and port 36 to passages 29 and the vacuum through annular recess 128 to cause the vane to move back to the right as exemplified in Figure 6. This oscillating movement of the vane will of course continue until the valve 5 is rotated to a parked position. Attention is directed to the fact that since the secondary valve 8 is in communication with the vacuum, it will be drawn toward the mounting plate and its flange 78 will act as a seal as it slides over the outer face of the mounting plate. It is of course to be understood that when the valve 5 is in the operating position just referred to, the shaft will be oscillating at its maximum speed. To reduce the rate of oscillation, it is merely necessary to move the valve 5 in a direction to reduce the volume of the suction at the ports 41 and 44 provided in the screws 27. The recess 131 communicating with the annular recess 128 is preferably V-shaped so that the passage of air between recess 128 and either of the ports 40 and 43 leading to passages 39 and 42 may be easily regulated, and so that the wiper arm and blade assembly may be eased or slowly moved to the desired parking position.

As briefly described above, the driver 93 movable with the shaft 7 serves to oscillate the cam member 59 relative to the shaft and when the cam member reaches a predetermined position, the spring 68 under compression will cause the rocker arms to snap the cam member against the oscillating member 76 which carries the secondary valve 8. More particularly, the guide plate 86 is keyed to the shaft 7 and the driver 93 to the plate by means of the fingers 95 and 96 extending through the slots 89. Since the driver moves with the shaft the finger 95 on the driver will alternately engage the spaced abutments 62 and 63 on the cam member. Assuming that the oscillating member 76 has been flipped to place the secondary valve in the position illustrated in Figure 8 to cause the vane to be pulled toward the left, the cams 66 and 67 on member 59 will be located as shown in Figure 10. As the shaft 7, guide plate 86, driver 93 and vane 12 rotate clockwise, the oscillating member 76 and cam member 59 will remain stationary until the upper finger or lug 95 on the driver 93 engages the abutment 63 on the cam member as shown in Figure 9, whereupon the cam member is rotated along with the driver causing the cam 66 to move out of the notch 70 in the rocker arm 57 and cam 67 to act against abutment 74 on arm 58. This movement of the cam member 59 causes the upper extremities of the rocker arms to spread apart or diverge and compress the spring 68 as viewed in Figure 13, and the instant the cams ride over the abutments 71 and 74 and beyond center, the arms will snap the cam 66 on member 59 against the notch 79 on the oscillating member 76 to cause the latter to flip over so that the secondary valve 8 will cover hole 37 and aperture 50 as shown by the dotted lines in Figure 27, after which the vacuum will cause the vane to be moved back to the right in a counter-clockwise direction. When the hole 37 and aperture 50 are so covered, the cam 67 will be seated in notch 73 of rocker arm 58 and cam 66 against the abutment 71 on arm 57, and rubber bumper 82 against abutment 72 on arm 57. As the shaft 7, driver 93, guide plate 86 and vane 12 travel in the counterclockwise direction just stated, the oscillating member 76 and cam member 59 will remain stationary until the finger 95 on the driver engages the abutment 62 on member 59 whereupon the member is rotated along with the driver causing the cams 66 and 67 to urge the upper extremities of the rocker arms 57 and 58 outwardly to compress the spring 68 and the instant the cam member 59 is moved past center, it will be thrown to snap cam 67 against the notch 80 of the oscillating member 76 to flip the latter back to a position where secondary valve 8 will again cover hole 37 and aperture 47.

If found desirable, the parts could be so designed and constructed that the lower finger 96 on the driver would engage the lower marginal edge 64 on the cam member at the same time that finger 95 engages abutment 63 and the same applies with respect to the marginal edge 65 and abutment 62, or the arrangement may be such that the lower finger 96 will alternately engage the edges 64 and 65 in lieu of the finger 95 engaging abutments 62 and 63.

It is to be noted that the points of engagement between the finger 95 on the driver and the abutments 62 and 63 on the cam member are adjacent to the base of the notch which forms the abutments 62 and 63 and are relatively close to the axis of the shaft 7.

As stated above, one of the important objects of the invention is to provide a unique arrangement whereby the range of rotational movement of the shaft and vane may be varied, within practicable limits, to meet different installation requirements. Thus, one motor equipped with the manual control of the subject invention exemplified in Figures 15, 16 and 19 through 25 may be installed in any one of a considerable number of different types, makes or models of automotive vehicles. With such a motor, the replacement setup is improved as described at the beginning of this specification. This manual control is operable independently of the control 9 and as pointed out above is preferably primarily carried by the cover 98 shielding the secondary valve actuating mechanism.

Figure 21:
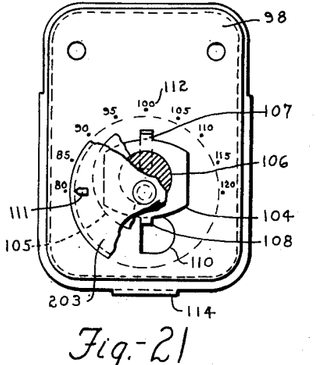
Figure 21 is a front view, similar to Figure 19, illustrating different positions of certain parts.
Figure 22:
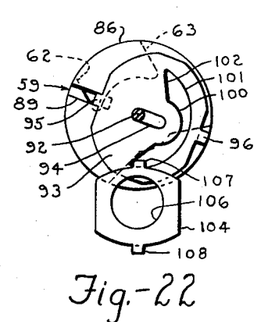
Figures 22 through 25 illustrate the cooperative relationship between the manual subassembly depicted in Figures 19, 20 and 21, and those components operatively connected with the secondary valve mechanism shown in Figure 14, whereby one may obtain a desired range of rotation of the motor shaft and the vane.
Figure 23:
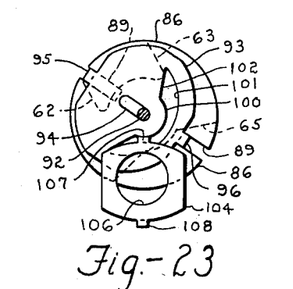
Figure 24:
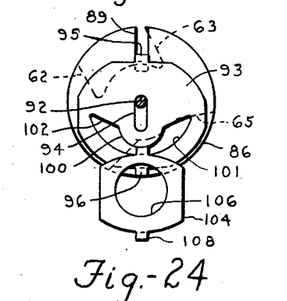
Figure 25:
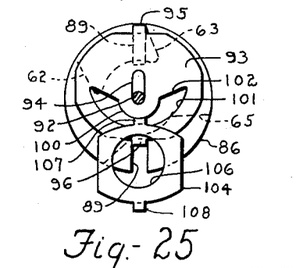

This manual control may be operated by merely manipulating the knob 203. When, for example, a particular installation requires that the motor shaft oscillate within the maximum range of 120 degrees, the knob will be located so that the arrow 111 thereon will register with the 120 degree mark on the cover as illustrated in Figure 19, in which position the upper finger 95 on the driver will be located as shown in Figures 8, 9, 12, 22 and 24 and the upper lug 107 on the actuating element 104 will be arranged adjacent to the lower marginal arcuate edge 101 of the curved slot 99 in the driver. If, for example, the installation requires the minimum range of 80 degrees, the knob will be turned to place the arrow opposite the 80 degree mark as illustrated in Figures 21, 23 and 25, in which position the finger 95 on the driver 93 will be located a greater radial distance from the axis of the shaft 7 and consequently, such finger will alternately engage the outer extremities of the abutments 62 and 63 to cause the driver, guide plate and vane to travel a shorter rotational distance than when the control is set for a maximum range. This difference in rotational ranges is due to the fact that the driver is adjustable with respect to the cam member so that the finger 95 may, within practicable limits, be moved to any one of a number of infinite radial distances from the shaft axis to obtain a rotational range within 80 to 120 degrees as illustrated. It will be noted that the faces of the abutments 62 and 63 are arranged at an angle with reference to a line passing through the fingers 95 and 96 on the device so that the upper finger 95 will travel a shorter circumferential distance to engage the abutments when located farther away from the shaft axis as shown in Figure 23 than when closer as depicted in Figure 22. Obviously, the components employed to obtain the rotational ranges just referred to may be modified to obtain a range less than 80 degrees or in excess of 120 degrees.

When the installation requires that the motor should function to rotate its shaft and a wiper arm operatively connected thereto within a range less than the maximum, the knob will be rotated so that the upper lug 107 on the actuating element 104 will forcibly engage the upper marginal edge 100 of the curved slot 99 provided in the driver 93 to move the finger 95 on the driver outwardly whereby the finger may alternately engage the abutments 62 and 63 on the cam member. The finger 95 may be pulled back to obtain the maximum rotational movement of the shaft, by manipulating the knob so that the lug 107 will be drawn against the lower marginal edge 101 of slot 99. The straight marginal edge of the opening 110 in the cover 98 provides a stop for the lower lug 108 of the actuating element 104 but it is to be understood that other means suitable for the purpose may be employed to limit movement of the actuating element when operated by the eccentric 103. The opening 110 also provides clearance for the lug 108 in order that the actuating element may be pivoted by the eccentric 103 and at the same time slide relative to the cover 98. As pointed out above, the upper and lower marginal edges 100 and 101 of the curved slot 99 are of different radial dimensions and as a consequence, the marginal edges are located closer together at a point substantially in alignment with the fingers 95 and 96 and straight slot 94. Accordingly, the space between the marginal edges at such point is of a size to accommodate the upper lug 107 of the actuating element in order to hold the cam member and actuating element assembled to obtain proper mechanical adjustment and movement therebetween. This manual control assembly has proven satisfactory in use and provides means whereby the rotational range of movement of the vane may be readily varied before or while the motor is in operation although in the majority of installations the control will be set for a predetermined range prior to installation. This manual control is entirely independently operable of the control unit 9.

It is to be understood that the scale or dial may be omitted and the adjustment may be made after the motor is installed, connected and ready for service—in which event the positions of the windshield wiper blade with relation to the windshield frame determine visually what the adjustment should be.

It will be noted that as wear, stretch or other abnormal conditions in the transmission mechanism between the motor and the windshield wiper blade develop so as to create "slop" permitting the wiper arm and/or blade to slap the windshield wiper frame objectionably when the wiper is in operation, this control may be adjusted to shorten the rotational arc of the wiper blade to prevent such "slap." This is a rather prevalent condition affecting certain original types of installation.

Figure 30 of the drawing exemplifies a modified way of operatively connecting a primary valve 300 with an operating lever 301. In this modification, the tab 302 of the lever is offset approximately at a 15 degree angle with respect to a line passing through the center of the valve and raised or elevated portions 303 and 304 thereof. With this arrangement, the lever may be assembled with the valve as illustrated to predetermine the travel or movement of the valve and lever assembly in one direction depending on one installation. The construction also permits assembly of the lever with the valve in a reverse or alternative position as exemplified by the dotted lines, so that the travel or movement of the valve may be predetermined for a different installation. In other words, the valve and lever of this modified construction may be assembled to meet various installation requirements. In this connection, attention is directed to the fact that the valve body is provided with a notch 305 as illustrated in Figure 4, which limits the rotational movement of the valve by reason of the fact that the abutments 306 formed by the notch may be engaged by the tab of either lever.

Having thus described my invention, it is obvious that various modifications may be made in the same without departing from the spirit of the invention, and, therefore, I do not wish to be understood as limiting myself to the exact forms, constructions, arrangements, and combinations of parts herein shown and described and defined in the claims.

I claim:

1. A windshield wiper motor comprising a housing, a cover secured to the housing, a throttle valve body carried by the cover, a valve in the body, a manual control for the valve, a mounting plate carried by said valve body, a shaft having a portion supporting a vane in the housing and having a portion extending through the mounting plate, valve operating mechanism mounted on the plate, a secondary valve actuable by said mechanism, passageways provided in the valve body leading to the throttle and secondary valve, a driver associated with the shaft for holding the mechanism on the shaft, a member adjacent the driver, and means movably supported on the member for adjusting the driver.

2. A fluid motor comprising a chambered housing, a movable piston in said chamber, a shaft carrying said piston and extending exteriorly of the chamber, a throttle valve and a secondary valve carried by the housing, mechanism spaced apart from the piston for operating the secondary valve, passages communicating with the chamber, said valves and said passages being constructed and arranged whereby when the throttle valve is connected to a vacuum and moved in one position, the piston and shaft will be caused to travel back and forth within a predetermined path in the chamber, means operative in conjunction with said mechanism for controlling the range of the travel of the piston and shaft, and manually actuated means connected with said operative means for actuating the latter, said connection being independent of said shaft.

3. In an oscillating fluid motor assembly, a housing, a piston operable in said housing, passageways in said housing, a shaft mounted on said housing and oscillated by said piston, a reversible valve disposed adjacent said shaft and slidably disposed over said passageways, a cam member rotatably mounted on said shaft and having diametrical opposed cam faces, said cam member being adapted to actuate said valve, a driver movable with said shaft and adapted to actuate said cam member, rockers pivotally disposed on opposite sides of said cam member and adapted to engage the respective cam faces of said cam member, resilient means associated with said rockers whereby to urge said rockers toward said cam member, a shield covering the cam member, a manual control carried by the shield and having a part extending through the shield for engaging the driver to cause the driver to actuate the cam member in a manner whereby the oscillating range of the piston may be varied.

4. A fluid motor comprising a housing, a piston vane operable in said housing, passageways in said housing, a shaft mounted on said housing and oscillated by said piston vane, a reversible valve cooperable with said passageways, a cam member rotatably mounted on said shaft and adapted to actuate said valve, a pair of abutments on said cam member, spring pressed means bearing against the cam member, a driver having a projection for alternately engaging the abutments to move the cam member a predetermined distance whereupon the spring pressed means will cause the cam member to snap the reversible valve with respect to certain passageways, a support, a manual control member carried by the support, an actuating element having a lug extending through the support and cooperable with the driver, and means movable with the control member for actuating the element to cause its lug to move the driver so that the projection thereon may be disposed at different radial distances from the shaft to engage the abutments at various points whereby the oscillating range of the shaft and vane may be varied.

5. A fluid motor having automatic valve mechanism disposed to occupy either one of two operative positions for controlling movement of a shaft carrying a vane, said automatic valve mechanism including an oscillating part and being operably responsive to the movement of said vane, an element movable to shift said oscillating part, pressure members mounted in opposed relation for movement with respect to said element, spring means urging said pressure members so that said element may be rapidly moved ahead when beyond a predetermined position, resilient means for cushioning the movement of the oscillating part, a driver, and means whereby the driver may be manipulated to engage the element at an infinite number of points so that the movement of the vane may be varied when desired.

6. A fluid motor having automatic valve mechanism disposed to occupy either one of two operative positions for controlling movement of a driving vane forming a component thereof, said automatic valve mechanism including an oscillating part and being operably responsive to the movement of said vane, a cam member movable to shift said oscillating part, cam pressure members mounted in opposed relation for movement with respect to said cam member, spring means urging said cam pressure members so that said cam is snapped against the oscillating part when moved beyond a predetermined position, a support provided with an opening, an actuating part on one side of the support, a movable member engaging the actuating part, a knob member for actuating the movable member, a driver part arranged on the other side of the support, means extending from one of said parts through the opening and cooperating with the other part, means for maintaining the members and parts assembled so that manipulation of the knob member will cause the movable member to move the actuating part in order that the extending means will operate the driver part to cooperate with the cam member in a manner whereby the travel of the vane may be varied when desired.

7. A valve operating mechanism for a fluid motor comprising a mounting plate, said plate having an aperture, a shaft rotative in said aperture, a middle port provided in the plate, two additional ports spaced away respectively at either side of said middle port, an oscillator rotatively mounted on the shaft, a hollow valve controlled by the oscillator and arranged to cover alternatively the middle port and one or another of the outer ports, a cam member rotatably mounted on the shaft, a pair of opposed spring urged members adapted to bear against the cam member, and an element carried by and movable with the shaft for engaging the cam member, the construction and arrangement being such that when the cam member is moved beyond a predetermined rotative position the spring pressed members cause the cam member to snap ahead of the oscillator to rapidly move the valve forwardly, said element being adjustable to engage the cam member at different radial distances from the shaft axis whereby the arc of rotational movement of the shaft may be varied as desired.

8. A valve operating mechanism for a fluid motor comprising a mounting plate, said plate having an aperture, a shaft in said aperture, a middle port provided in the plate, two additional ports spaced away respectively at either side of said middle port, an oscillator rotatively mounted on the shaft, a hollow valve controlled by the oscillator and arranged to cover alternatively the middle port and one or the other of the outer ports, a cam member rotatably mounted on the shaft, a pair of opposed spring urged members mounted on the plate and adapted to bear against the cam member, and an element movable with the shaft to engage the cam member when the shaft is rotated, the construction and arrangement being such that when the cam member is moved beyond a predetermined rotative position by the element the spring pressed members will cause the cam member to act against the oscillator to rapidly move the valve to its opposite extreme, said element being adjustable to engage the cam member at different radial distances from the shaft axis whereby the rotational arc of the shaft may be varied when desired.

9. A valve operating mechanism for a fluid motor comprising a mounting plate, said plate having an aperture thereon, a shaft rotative in said aperture, a middle port provided in the plate, two additional ports spaced from each side of said middle port, an oscillator rotatively mounted on the shaft, a hollow valve carried by the oscillator and arranged to cover alternatively the middle port and one or the other of the outer ports, a kicker rotatably mounted on the shaft, a pair of opposed spring urged members bearing against the kicker, an element engageable with the kicker, the construction and arrangement being such that when the kicker is moved beyond a predetermined rotative position by the element the spring pressed members will cause the kicker to act against the oscillator to rapidly move the valve forwardly, said element being adjustable in a direction transverse to the shaft axis for engaging the kicker at one point to obtain one range of rotational movement of the shaft and at another point to obtain a different range of movement, and a guide for said element.

10. A fluid motor comprising a housing provided with a chamber, a shaft supported on said housing, a vane carried by the shaft and disposed in the chamber, automatic valve mechanism disposed to occupy either one of two operative positions for controlling movement of the vane, said automatic valve mechanism including an oscillating part and being operably responsive to the movement of said vane, an element movable to shift said oscillating part, pressure members mounted in opposed relation for movement with respect to said element, spring means urging said pressure members so that said element may be rapidly moved ahead when beyond a predetermined position, a driver, and means whereby the driver may be manipulated to engage the element at an infinite number of points so that rotational movement of the shaft may be varied when desired.

11. A valve assembly for fluid motors comprising a valve seat, an oscillatable shaft, a valve pivotally mounted on the shaft for oscillatory movement on the valve seat, means for arresting the movement of the valve, a lost motion adjustable actuating means mounted on the shaft for oscillating the valve and for controlling the arc of oscillation of the shaft, resiliently connected rocker arms pivotally mounted on axes at opposite sides of and parallel to the axis of the shaft operably engaging said actuating means for accelerating the movement of the valve with a snap action, and manual means operably engaging the adjustable actuating means for selecting and maintaining the arc of oscillation of the shaft within a predetermined range.

12. A valve device for fluid motors, said device comprising a body provided with passageways terminating in ports, an oscillatable shaft mounted on the body, a valve pivotally mounted on the shaft for oscillatory movement for controlling the flow of fluid through the ports, means for arresting movement of the valve, adjustable actuating means mounted on the shaft for oscillating the valve and for controlling the arc of oscillation of the shaft, resiliently connected rocker arms pivotally mounted on axes at opposite sides of and parallel to the axis of the shaft operably engaging said actuating means for accelerating the valve with a snap action, and means operatively connecting the actuating means for maintaining the arc of oscillation of the shaft within a predetermined range.

13. A valve device for fluid motors, said device comprising a body provided with passageways terminating in ports, a mounting plate secured to one side of the body and provided with openings registering with said ports, an oscillatable shaft mounted on the body and extending through the plate, a valve pivotally mounted on the shaft for oscillatory movement for controlling the flow of fluid through the openings, means for arresting the movement of the valve, adjustable actuating means mounted on the shaft for oscillating the valve and for controlling the arc of oscillation of the shaft, resiliently connected rocker arms pivotally mounted on the plate on axes at opposite sides of and parallel to the axis of the shaft operably engaging said actuating means for accelerating the valve with a snap action, a support adjacent the actuating means, and means carried by the support operatively connecting the actuating means for maintaining the arc of oscillation of the shaft within a predetermined limited range.

14. A fluid motor comprising a chambered housing, a movable vane in said chamber, a shaft carrying said vane and having ends extending exteriorly of the chamber, a throttle valve and a secondary valve carried by the housing, actuating means adjacent one end of the shaft for operating the secondary valve, passages communicating with the chamber, said valves and said passages being constructed and arranged whereby when the throttle valve is connected to a vacuum and moved in one position, the vane will be caused to travel back and forth within a predetermined path in the chamber and when said throttle valve is moved to another position the vane will be caused to park beyond the normal operating path of the vane, a support located apart from the shaft and means carried by the support cooperable with the actuating means whereby the rotational movement of the vane may be varied.

15. A fluid wiper motor for a motor vehicle comprising a housing, a primary throttle valve carried by and communicating with the housing, a piston movable in the housing, a shaft operatively connected to the piston and extending from the housing and adapted for connection with a windshield wiper driving assembly, an enclosure carried by the housing, secondary valving mechanism disposed within the enclosure, said secondary valving mechanism including a reciprocating member operatively associated with the shaft, abutment means disposed within the enclosure and movable to abut said reciprocating member of said secondary valving mechanism whereby to alter the range of travel thereof, control means connected to said abutment means, said control means extending externally of the enclosure whereby to permit adjustment of said control means readily by the driver of the vehicle while said wiper motor is in operation.

16. A fluid wiper motor for a motor vehicle comprising a housing, a primary throttle valve carried by and communicating with the housing, a piston operable within a predetermined range in the housing, a shaft operatively connected to the piston and extending from the housing and adapted for connection with a windshield wiper driving assembly, an enclosure carried by the housing, secondary valving mechanism disposed within the enclosure, said secondary valving mechanism including an element operatively associated with the shaft and including a valve for controlling fluid communication with the piston, means movable into operative association with the element whereby to alter the operating range of said shaft and said piston, and control means connected to said movable means and extending externally of the enclosure whereby to permit adjustment of said control means readily by the driver of the vehicle.

References Cited in the file of this patent

UNITED STATES PATENTS

| Number | Name | Date |
|---|---|---|
| 1,426,049 | Dinwiddie | Aug. 15, 1922 |
| 1,502,729 | Lippert | July 29, 1924 |
| 1,563,758 | Lindberg | Dec. 1, 1925 |
| 1,693,665 | Phillips, Jr. | Dec. 4, 1928 |
| 1,738,311 | Oishei et al. | Dec. 3, 1929 |
| 1,853,758 | Brumm | Apr. 12, 1932 |
| 1,969,094 | Rappl | Aug. 7, 1934 |
| 2,075,959 | Previti | Apr. 6, 1937 |
| 2,173,357 | Dall | Sept. 19, 1939 |
| 2,260,853 | Hueber | Oct. 28, 1941 |
| 2,302,109 | Dodge | Nov. 17, 1942 |
| 2,344,913 | Ager | Mar. 21, 1944 |
| 2,348,492 | O'Shei | May 9, 1944 |
| 2,438,380 | Arens | Mar. 23, 1948 |
| 2,483,150 | Olson | Sept. 27, 1949 |
| 2,602,430 | Bell | July 8, 1952 |

FOREIGN PATENTS

| Number | Country | Date |
|---|---|---|
| 697,976 | France | Nov. 5, 1930 |